US006358352B1

(12) United States Patent
Schmidt

(10) Patent No.: US 6,358,352 B1
(45) Date of Patent: Mar. 19, 2002

(54) METHOD FOR CREATING HIGHER GRADE WOOD PRODUCTS FROM LOWER GRADE LUMBER

(75) Inventor: Ernest W. Schmidt, Sheridan, WY (US)

(73) Assignee: Wyoming Sawmills, Inc., Sheridan, WY (US)

( * ) Notice: Subject to any disclaimer, the term of this patent is extended or adjusted under 35 U.S.C. 154(b) by 0 days.

(21) Appl. No.: 09/344,666

(22) Filed: Jun. 25, 1999

(51) Int. Cl.[7] .......................... B32B 31/00; B27G 11/00

(52) U.S. Cl. ........................ 156/254; 156/304.1; 209/1; 209/44.1; 209/517; 428/903.3; 428/537.1; 428/535; 144/346; 144/348; 144/350; 144/351; 144/352; 144/344; 144/345

(58) Field of Search .............................. 156/254, 304.1; 144/346, 348, 350, 351, 352, 344, 345; 428/903.3, 537.1, 535; 209/1, 44.1, 517

(56) References Cited

U.S. PATENT DOCUMENTS 3,041,231 A * 6/1962 Fountain ..................... 156/254
3,878,016 A * 4/1975 Sadashige ................... 156/250
4,568,577 A 2/1986 Fischetti ...................... 428/33
5,074,092 A 12/1991 Norlander .................... 52/455
5,135,597 A 8/1992 Barker ....................... 156/264
5,593,530 A 1/1997 Hashiguchi ................. 156/260
5,618,371 A 4/1997 Sing ........................... 156/264
5,881,786 A 3/1999 Wilderman et al. ......... 144/348
5,888,620 A 3/1999 Grenier ...................... 428/172
6,042,680 A * 3/2000 Peterman .................... 156/254

OTHER PUBLICATIONS

"Wyoming Sawmills Receives Research Grant, " *Sheridan Press*, Mar. 6, 1997, 1 page.

* cited by examiner

*Primary Examiner*—Linda Gray
(74) *Attorney, Agent, or Firm*—Thomas C. Folsom; Chrisman Bynum & Johnson

(57) ABSTRACT

The present invention is directed to a process whereby low-grade lumber, (i.e., lumber having surface defects such as knots, voids, wane, and bark pockets, and warp defects such as twist, bow, crook and sweep), is converted to higher grade lumber and panel products. The process of the present invention involves first categorizing low-grade lumber, arranging a specified number of the categorized low-grade lumber side by side in a manner which offsets the surface defects on adjacent lumber by a minimum distance, and then face-laminating the categorized low-grade lumber together to form a cant. Warp defects such as bow, twist and crook are also offset in the arrangement of the cant and are straightened through the clamping and bonding process. The cant is then re-sawn to produce new, laminated wood products of a higher grade, each new laminated wood product including portions of the original lumber. The wood products may be structural dimensional lumber, 2×4 to 2×12 studs, and panels varying in thickness and width.

33 Claims, 10 Drawing Sheets

METHOD FOR CREATING HIGHER GRADE WOOD PRODUCTS FROM LOWER GRADE LUMBER

BACKGROUND OF THE INVENTION

1. Field of the Invention

The present invention relates generally to a method of producing high-grade wood products, and, more specifically to a method of creating high-grade wood products from low-grade wood.

2. Description of the State of the Art

Lumber produced in sawmills is sorted into various lumber grades. In the case of a stud mill, lumber is sorted into high-grade (stud grade) lumber and low-grade lumber. Wood products are relegated to low-grade categories because of naturally occurring defects that decrease lumber strength characteristics, and thus prohibit its use for high-grade structural applications. Economy grade is the lowest grade of lumber and at most makes up to about twenty percent of the lumber recovered from a typical sawmill. Low-grade lumber is used primarily in non-structural applications such as pallets and shipping dunnage (material used to fill voids for shipping products).

Typical defects found in economy lumber include wane, pockets, shake, skip, voids, and splits. Wane is the bark, or the lack of wood from any cause, on the edge or corner of a piece of lumber. A waney edge is the natural wavy edge of a plank, which may still be covered by tree bark. A pocket is a well-defined opening between the rings of annual growth which develops during the growth of a tree. It usually contains pitch or bark. A shake is a separation along the grain between growth rings, or a break through the rings, usually the result of high winds. Skip is an area on a piece of lumber that a planer fails to surface, classified for grading purposes as slight, shallow or small, and deep or heavy. A void is an opening in the surface of the lumber. A split is a separation of the wood through the piece to the opposite surface.

Economy grade lumber can also have warp defects, including twist, bow, crook, sweep or any combination thereof. Twist is a warp defect in a board in which the board tends to assume the configuration of a portion of a spiral. In lumber with bow, the edges of the board lie on parallel planes but the faces are curved, much like a rocker of a rocking chair. Crook is deviation from linearity of the edges of a piece of lumber when it is laid on one of its widest faces and is warpage 90° displaced from bow. A piece of lumber having only crook will have the faces lying in parallel plane with the edges curved. Sweep is longitudinal curvature along the tree, that is, sweep is the deviation from a straight line of the concave edge when the log is allowed to assume its natural position on a flat surface.

In a typical sawmill operation, logs are first sorted both in the woods and at the mill prior to processing. The next step is to de-bark useable logs and then process them through a primary breakdown such as a single bandsaw or a multiple bandsaw. This results in rectangular timbers known as "cants" that vary in size according to the initial log dimensions. Generally, a cant is a large piece of lumber destined for further processing by other saws. The cants are then processed through a gang saw that cuts the cant in one pass into individual studs. A re-saw cuts the cant longitudinally into two additional rectangular pieces, typically half the width of the original cant. The pieces of wood that result from resawing a cant through the narrow face are referred to as "flitches". The flitches are then processed through an edger that cuts studs in one pass. The studs are then stacked and processed though a kiln to dry the lumber to a suitable moisture content of nineteen percent or less. The drying process will always down-grade some studs by generating stresses that cause warp defects in the stud. The dry studs are then processed through a planer that puts a smooth finish on the surfaces of the studs.

After planing and drying, each stud is visually graded by certified graders. The graders evaluate all defects according to grade rules, such as rules formulated by Western Wood Products Association (WWPA) for lumber manufacturers. Studs that do not meet stud grade requirement, such as those that are twisted, warped, bowed, contain large knots, excessive wane, splits or other defects, are downgraded either to utility or economy grade. Stud grade is intended for use in wall construction in homes and is required to have the strength needed to support walls and roof loads.

Different species of wood yield different percentages of each grade of lumber. Typically, Ponderosa Pine will yield fifty five percent stud grade lumber and twenty five percent economy grade lumber. Lodgepole pine, Spruce, and Douglas Fir typically yield eighty percent stud grade lumber and fifteen percent economy grade lumber. The remaining percentage in each species results in utility grade lumber. Currently, most trees that can be identified as containing mostly low-grade lumber are not sawn, but rather remain in the woods as waste, are harvested and sold for firewood, or chipped as pulp. This causes a tremendous waste of resources, since an estimated additional ten percent of fiber could be salvaged from every acre of forest harvested if there was an economical use for this low-grade material.

The economy grade lumber from logs that are currently processed as described above is typically either chipped as pulp or is sold and then re-processed as finger joint blocks, pallets, or used as dunnage. Presently, the only method to upgrade the low-grade material into a structural product is to selectively cut out the defects and finger joint the remaining pieces together to produce finger jointed structural lumber. While the cut-up process can be effective in recovering usable blocks from economy grade studs, it is generally cost effective only when at least half of the piece is recovered. However, less than ten percent of economy grade lumber is suitable for the finger joint application. Hence, a significant portion of lumber is lost to low-grade applications, thus increasing overall sawmill costs, and increasing demand for quality studs. Other than a small percentage (about ten percent) used for finger jointing blocks, no effective method has been developed to process this type of lumber to a higher value product.

Until a few years ago, there was no pressing need for sawmills to consider using low-grade wood. Unprocessed saw logs were plentiful, and sawmills could afford to waste poorer logs because they were relatively abundant and the price of timber was relatively low. Currently, however, the available old growth forests the once provided sawn lumber in standard dimensions for construction material are diminishing rapidly. Therefore, most of the lumber produced today is from much smaller trees obtained from second growth forests. Second growth trees are much smaller, and therefore it is increasingly difficult to produce lumber in the sizes and lengths obtained from the older trees. In addition, a higher percentage of "waste", or unusable wood is produced in converting the second growth trees into lumber. An additional problem with second growth trees is that the physical geometry of the trees (i.e., twist, warp, bow) also contributes to the waste in producing straight lumber, since current methods generally comprise planing the wood to remove warpage, etc.

Current methods of producing laminated products involve the use of higher grade lumber that does not have defects such as twist, bow, crook or sweep from higher grade wood by various methods such as planing, cutting and/or pressing the wood prior to bonding pieces of lumber to make the laminated product. However, these current laminating methods have not been successful in utilizing economy grade lumber which has large knots, skips, pockets, warp, etc. This is due to the fact that economy grade lumber is either too warped to be resawn or falls apart if sawn prior to laminating due to the large knots in the lumber. Therefore, prior to the present invention, no process has been available to economically use low-grade material to create higher grade wood products.

SUMMARY OF THE INVENTION

Accordingly, it is a general object of this invention to provide a process by which low-grade lumber, (i.e., lumber containing defects such as wane, voids, skips, knots, splits, bark pockets, warp, etc.), is converted to higher grade lumber products. More specifically, the present invention provides a method by which economy grade lumber is converted to stud grade or higher grade lumber products.

It is another object of this invention to provide a method by which low-grade lumber having warp, twist, bow, knots, pockets, and other defects is converted to stud grade or higher grade lumber of various dimensions.

It is a further object of this invention to provide a method for preparing cants from low-grade lumber obtained from the same or from different species of trees for sawing into lumber of stud-grade or higher quality.

It is a further object of the invention to provide a high-grade laminated stud suitable for use as construction material.

It is a further object of the invention to provide a method wherein a higher percentage of low-grade wood material is converted into useful products suitable for construction material.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims. It should be understood, however, that the detailed description and specific examples, while indicating preferred embodiments of the invention, are given by way of illustration only, since various change and modifications within the spirit and scope of the invention will become apparent to those skilled in the art from this detailed description.

To achieve the foregoing and other objects and in accordance with the purposes and objects of the present invention, as embodied and broadly described herein, the method of the invention comprises (i) categorizing low-grade studs, (ii) arranging a plurality of categorized low-grade studs side by side in a specific manner such that surface defects such as knots or voids on adjacent studs are offset by a specified minimum distance and such that warp defects are counteracted, (iii) face-laminating the studs together to form a cant, and (iv) resawing the cant to yield laminated products which are classified as stud grade or higher. During the laminating process, warp defects may be removed from the cant by counteracting these defects in adjacent studs and applying pressure to the cant. The resulting laminated products are free of bowing or twisting, and have an acceptable amount of surface defects relative to the size of the final product, thus increasing the quality rating of the final laminated product relative to the original low-grade studs.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 4A illustrates a stud lay-out for preparing five laminated 2×4 studs;

FIG. 4B illustrates a stud lay-out for preparing twelve laminated 2×4 studs;

FIG. 4C illustrates a stud lay-out for preparing two 2×6 laminated studs;

FIG. 4D illustrates a stud lay-out for preparing two 2×8 laminated studs;

FIG. 4E illustrates a stud lay-out for preparing four 2×10 laminated studs;

FIG. 4F illustrates a stud lay-out for preparing two 2×12 laminated studs;

FIG. 4G illustrates a stud lay-out for preparing two 2×14 laminated studs; and FIG. 4H illustrates a stud lay-out for preparing three laminated panels.

DETAILED DESCRIPTION OF THE PREFERRED EMBODIMENTS

The present invention provides a unique process for preparing high-grade laminated wood products from low-grade lumber, and further provides high-grade laminated wood products produced by the method of the invention.

Figure 1:
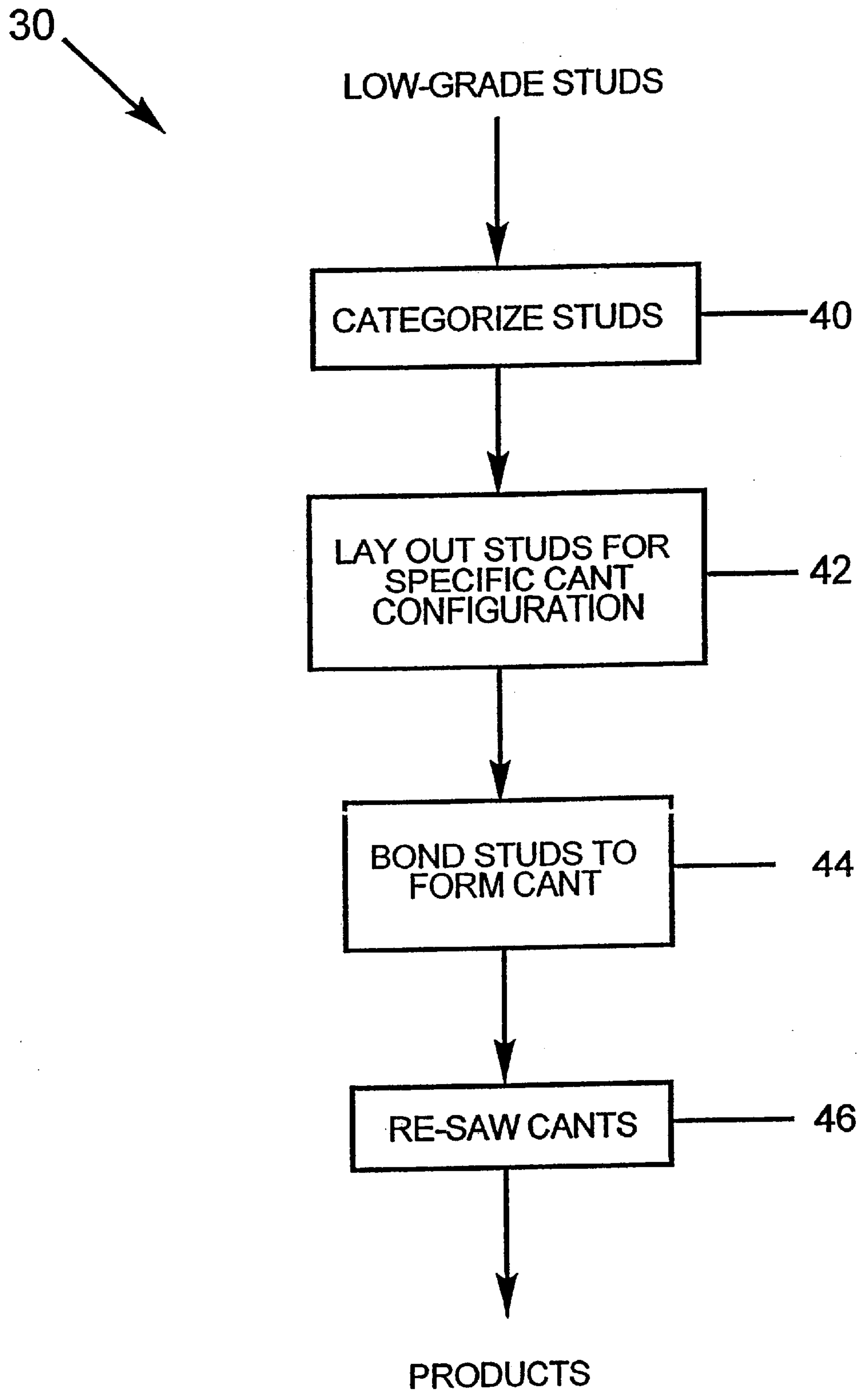
FIG. 1 is a flow chart illustrating the method of the invention.

Briefly, a preferred method 30 of the invention is shown generally in FIG. 1. The method 30 involves first categorizing the low-grade studs in step 40 according to novel, specific guidelines which categorize the low-grade studs based on the number, size, and degree of surface defects such as knots, wane, skip, voids, etc. on the stud. The categorized studs from step 40 are then arranged in step 42 according to novel, specific layout rules in a manner in which surface defects in each stud are off-set by a minimum distance from surface defects in adjacent studs, and wherein warp defects are counteracted from warp defects on adjacent boards. The arranged studs from step 42 are then face-laminated in step 44 to form a cant, which will vary in size depending on the dimensions and the number of the individual low-grade studs comprising the cant. The resulting cant comprises studs having significant surface defects which are bound between adjacent studs having fewer defects. Warp defects in the studs, such as bow, crook, sweep, and twist are removed in step 44 through a clamping and bonding process after the cant has been formed. Finally, the cants from step 44 are re-sawn in step 46 to yield high-grade laminated wood products. Thus, the cant produced in step 44 may be reprocessed or re-sawn in step 46 into a variety of wood products such as structural dimensional lumber, including 2×4 to 2×14 or larger studs, and panels varying in thickness and width. Each of steps 40, 42, 44 and 46 of method 30 will be discussed in more detail below.

A significant key to the success of the method 30 of this invention is that the low-grade studs are first specifically arranged and bonded to form the cant, and then only after the cant has formed are the high-grade, laminated products produced by re-sawing the cant, which is far more stable and stronger than the original low-grade studs. Without first face laminating low-grade studs according to the method of this invention prior to re-sawing, this low-grade lumber could not be used to make high-grade products. The laminating enables the low-grade lumber to be handled effectively and efficiently, since low-grade lumber containing defects such as knots, etc. will usually fall apart if processed for re-sawing prior to laminating, and further low-grade is often too warped to be re-sawn. The method 30 of this invention is therefore novel in that the method 30 provides a means for converting low-grade studs, including economy grade studs which are typically discarded as unusable, into high-grade lumber, in an economical manner. More specifically, the invention describes a method 30 for converting economy grade studs into laminated wood products having high grade qualities such as Stud grade, No. 2 grade, Construction grade, No. 1 grade, and Select Structural grades, as shown in Scheme 1. Scheme 1 shows the various structural lumber grades according to industry grading standards, ranked from the lowest grades (Economy, No. 4, and No. 5) to the highest quality grade of lumber (Select Structural). Such grade qualities are well-known and understood by persons of skill in the art.

Scheme 1

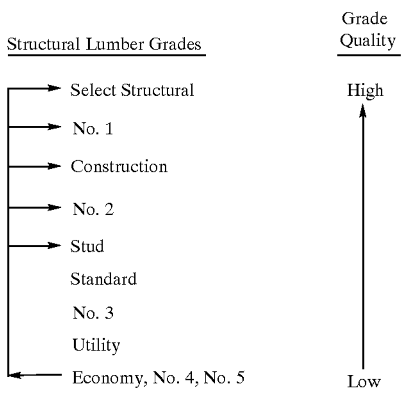

The term "low-grade" as used herein refers to any grade of wood which is of a lower grade than stud-grade, and includes economy grade, utility grade, grade numbers 3, 4, or 5, and standard grade, according to known industry standards for grading wood.

The term "high-grade" as used herein refers to wood graded as stud grade or higher, such as No. 2 grade, construction grade, No. 1 grade, and Select Structural grade. "High-grade" also includes specialized grades for woods used as laminates, referred to as grades L1, L2 and L3.

The term "stud" as used throughout refers to a rectangular board having two parallel faces and two parallel edges, and is not intended to be limited to any particular dimensions. Typically, stud dimensions are defined as X×Y×Z, where "X" is the height of the stud in inches and is typically two inches, "Y" is the width of the stud in inches and is typically four to fourteen inches, and "Z" is the length of the stud in feet and is typically twelve feet or less. Studs used in method 30 of the invention may be obtained from various species of trees, including, but not limited to, Douglas Fir and White Woods.

The term "surface defects" as used herein refers to defects such as knots, wane, skip, splits, voids, bark pockets, and the like. "Surface defects" includes defects which penetrate into the depth of a stud, and are not limited to only those defects which are on the outermost surface of a stud.

The terms "warp defects" and "warpage" as used herein are interchangeable and refer to alignment defects, that is, any deviation from a true or plane surface, including twist, bow, crook, sweep or any combination thereof.

The preferred method 30 of the invention provides a method of converting low-grade wood to higher grades as indicated in Scheme 1. More specifically, the preferred method 30 of the invention begins by sorting low-grade studs as indicated in step 40 of FIG. 1. A significant and novel feature of the method of this invention is that low-grade studs are visually inspected and sorted during step 40, according to specific selection rules, into one of four categories, designated "A" , "B", "C" or "Reject". Application of these rules during step 40 is a first and important step in enabling an efficient production of a high percentage of laminated wood products from the low-grade studs. As will become apparent from the detailed discussion below, the category "B" and "C" studs can be further subcategorized into "B-6", "B-8", "B-1", "B-12", "B-14", "C-6", etc. subcategories, depending on the desired sizes and properties of the final laminated products. A general description of each category is as follows:

"A"—These studs preferably contain no large knots, have little wane, and no skip. These studs usually are economy grade lumber because of warp defects such as twist, bow, crook, or sweep.

"B"—These studs typically have large knots, splits, and/or bark pockets. "B" studs preferably are not used on the exterior of the cant, since "B" category studs typically contain the most defects, and therefore, "B" category studs are the lowest quality studs of the "A", "B"and "C" categories.

"C"—These studs may have larger knots than the "B"category of studs, and may have some wane, provided that the wane (that is, a single, continuous area of wane) does not exceed ¼ the width of the stud. The wane face is preferably not used as the adhesive face. Preferably, when using "C" studs to assemble a cant, the studs are arranged such that any large knots on the "C" stud are not on the exterior of the assembled cant.

"Reject"—Economy grade studs are rejected for the method 30 of the invention if they are unable to be categorized as "A", "B", or "C" studs according to the selection step 40 of method 30.

Figure 2A:
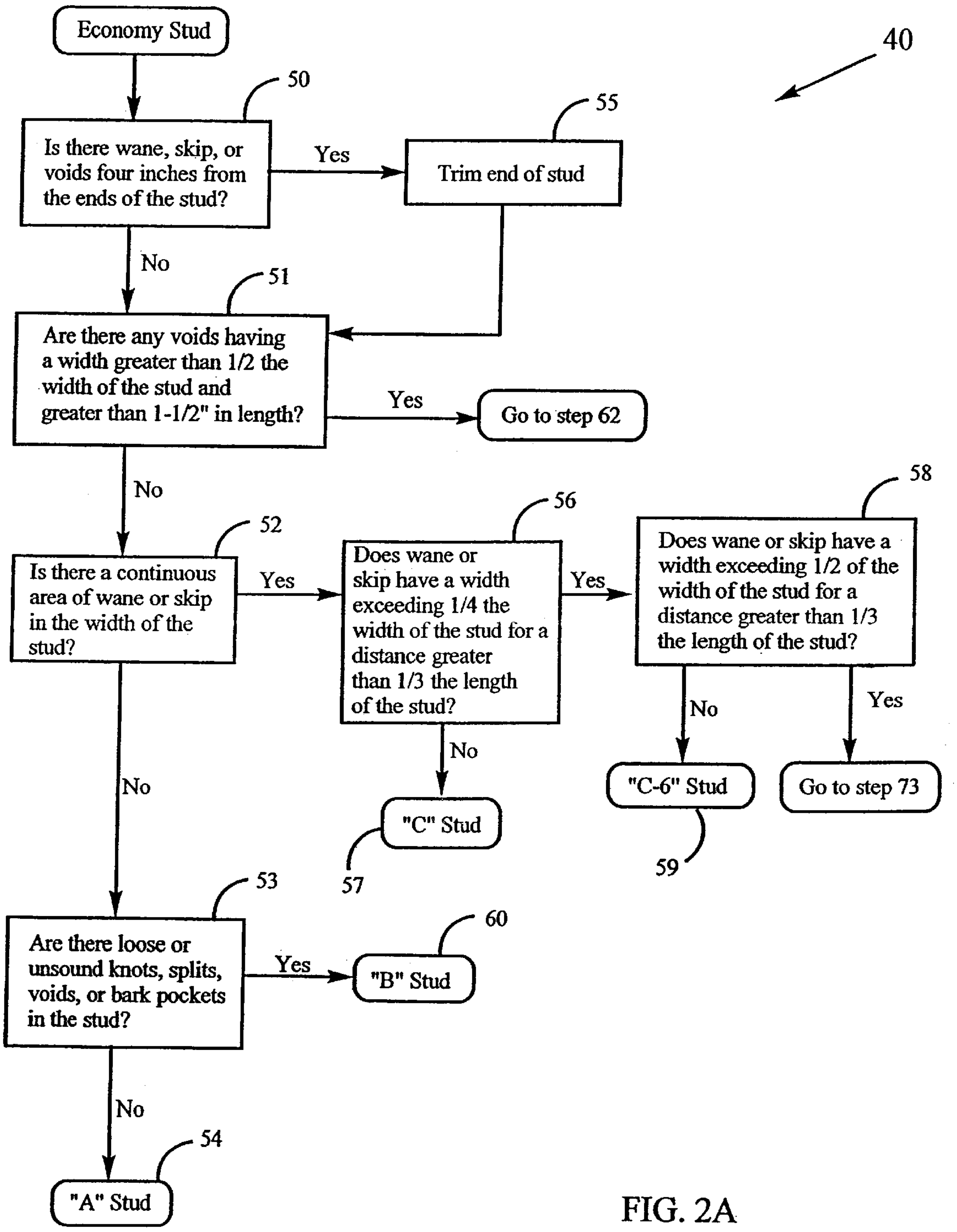
FIGS. 2A–2C are flow charts detailing the selection step of the method of FIG. 1.
Figure 2B:
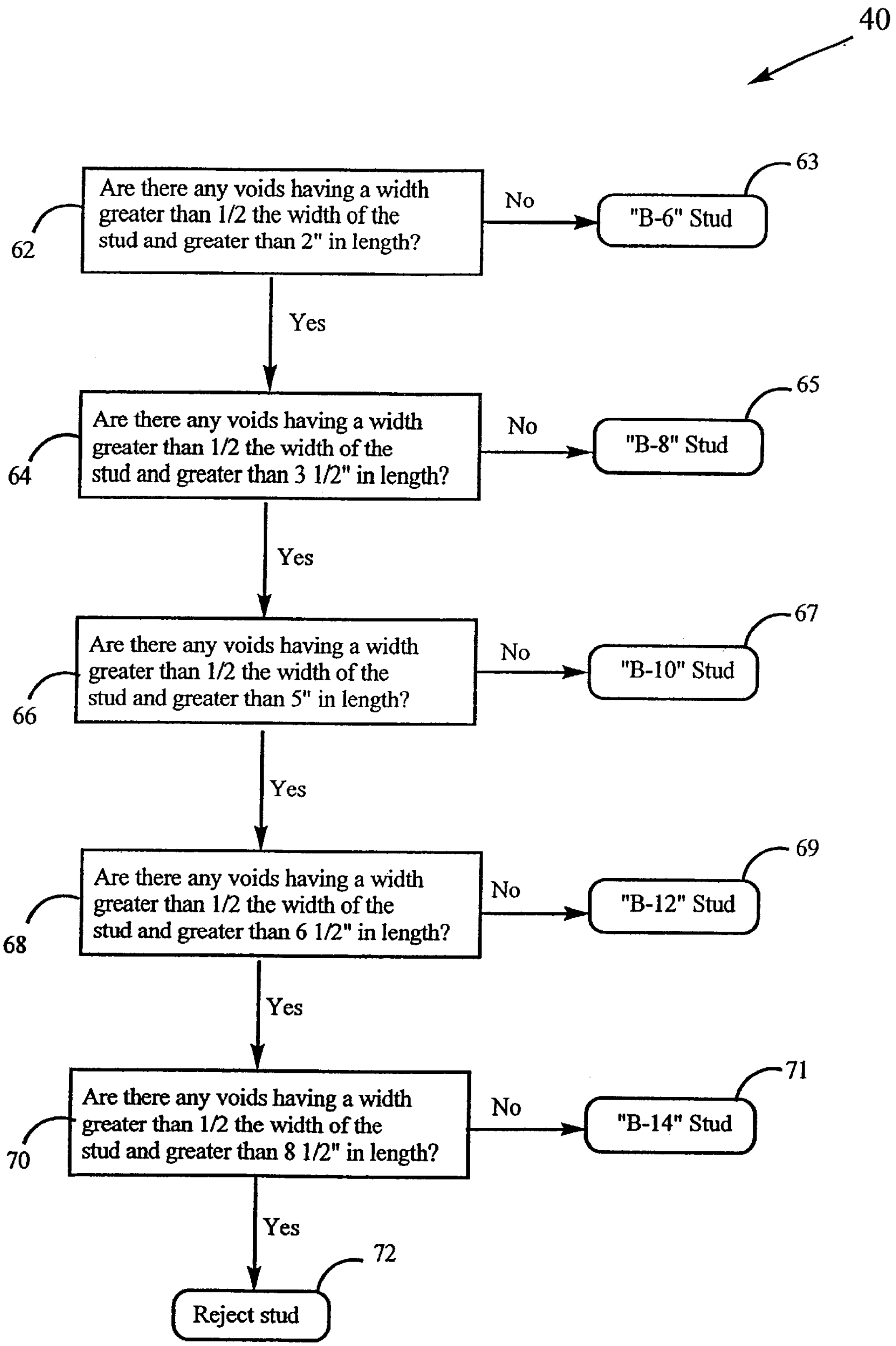
Figure 2C:
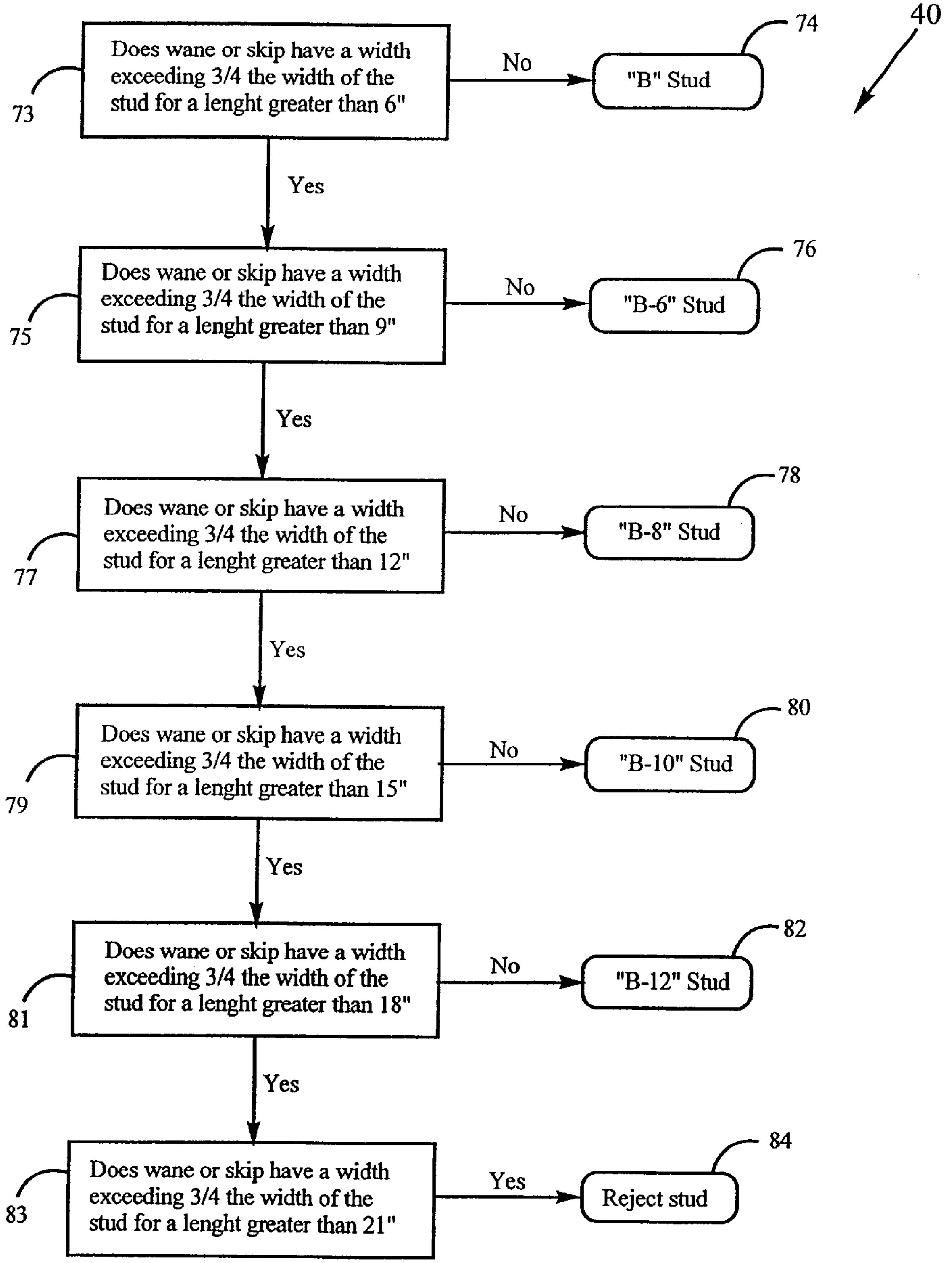

FIGS. 2A–2C describe in more detail the novel selection rules utilized in step 40 of preferred method 30 for categorizing low-grade studs into categories “A”, “B”, “C”, or “reject”. Typically, the studs are inspected visually, however, the method 30 is not limited to visual inspection, and other inspection or detection methods, such as x-ray imaging, sound-based imaging, or laser-based imaging may also be employed in the inspection step. The inspection may be performed by a person or a machine.

Referring now to FIG. 2A, steps 50–54 delineate the novel guidelines of this invention for the inspection step 40 for determining whether a low-grade stud is to be designated as an “A” stud. Starting with step 50, if upon inspection a stud is determined to be essentially free of wane, skip or voids within four inches of the ends of the stud, the process continues to step 51. Alternatively, if the stud inspected in step 50 does have wane, skip or voids within four inches of the ends of the stud, the process continues to step 55, as will be discussed below. If the stud meets the requirements of step 50, the process continues to step 51, where the stud is again visually examined. In step 51, if the stud is found to be essentially free of at least one void having a width that is greater than one-half the width of the stud and a length greater than one and one-half inches, the process continues to step 52. If, on the other hand, the stud had been found to have at least one void having a width that is greater than one-half the width of the stud and a length greater than one and one-half inches, the process would continue to step 62, discussed below. If the process does continue to step 52, the stud is again visually inspected. In step 52, if the stud is found to be essentially free of a continuous area of wane or skip in the width of the stud, the process continues to step 53. Otherwise, the process continues to step 56 discussed below. If the process continues to step 53, the stud is again visually inspected, and if it is found to be essentially free of loose or unsound knots, splits, voids or bark pockets in the stud, the low-grade stud will be designated an “A” stud in step 54. The term “loose” is an art-recognized term referring to moveable defects, such as a loose knot. The term “unsound” is an art-recognized term referring to any kind of decay in the stud. On the other hand, if in step 53 the stud is found to have loose or unsound knots, splits, voids or bark pockets in the stud, the stud is designated a “B” stud in step 60.

Referring back to step 50 of method 40, if the stud does have a continuous area of wane, skip, or one or more voids, any of which are four inches or less from the end of the stud, the inspection process may proceed to step 55, in which the stud is trimmed to remove the wane, skip or void, and the shortened stud from step 55 continues through the selection process by proceeding to step 51. This shortened stud from step 55 will be arranged with similarly shorter studs which were also obtained from step 55 when forming a cant in step 42 of method 30.

Referring back to step 52 in FIG. 2A, if in this step the stud is found to have a continuous area of wane or skip in the width of the stud, the inspection process continues to step 56. In step 56, if the stud is found to have a continuous area wane or skip, but the continuous area of wane or skip does not exceed one-fourth of the width of the stud for a distance greater than one-third the length of the stud, the stud will be designated a “C” stud in step 57. Alternatively, if in step 56 the stud is found to have a continuous area of wane or skip wherein the continuous area exceeds one-fourth of the width of the stud for a distance greater than one-third the length of the stud, the inspection process continues to step 58. In step 58, if upon visual inspection the continuous area of wane or skip exceeds one-fourth the width of the stud but does not exceed one-half the width of the stud for a distance greater than one-third the length of the stud, the stud is designated a “C-6” stud in step 59. Otherwise, the inspection process continues on to step 73 as described below.

Referring back to step 51 in FIG. 2A, if the stud did not meet the requirements to proceed to step 52 due to the presence of at least one void having a width that is greater than one-half the width of the stud and having a length greater than one and one-half inches, the inspection process continues to step 62, which begins in FIG. 2B. In each of steps 62–72 shown in FIG. 2B, a void which was found to have a width greater than one-half the width of the stud in step 51 is now examined to determine the length of that particular void, in order to further categorize the stud. In step 62, if a void has a width over one-half the width of the stud and a length greater than one and one-half inches but less than two inches, the stud is designated a “B-6” stud in step 63. Otherwise, the process continues to step 64. In step 64, if a void has a length greater than two inches but less than three and one-half inches, the stud is designated a “B-8” stud in step 65. Otherwise, the process continues to step 66. In step 66, if a void has a length greater than three and one-half inches but less than five inches, the stud is designated a “B-10” stud in step 67. Otherwise, the process continues to step 68. In step 68, if a void has a length greater than five inches but less than six and one-half inches, the stud is designated a “B-12” stud in step 69. Otherwise, the process continues to step 70. In step 70, if a void has a length greater than six and one-half inches but less than eight and one-half inches, the stud is designated a “B-14” stud in step 71. On the other hand, if in step 70, a void has a length greater than eight and one-half inches, the stud is rejected in step 72.

Referring back to step 58 in FIG. 2A, if in step 58 the stud is determined to have at least one continuous area of wane or skip exceeding one half the width of the stud for a distance of greater than one third the length of the stud, the inspection process continues to step 73, which begins in FIG. 2C. In step 73, if the stud is determined to have at least one continuous area of wane or skip exceeding three quarters of the width of the stud for a length greater than one third the length of the stud but less than six inches in length, the stud is designated a “B” stud in step 74. Otherwise, the process continues to step 75. In step 75, if the stud is determined to have a continuous area of wane or skip that is greater than six inches but less than nine inches in length, the stud is designated a “B-6” stud in step 76. Otherwise, the process continues to step 77. In step 77, if the stud is determined to have a continuous area of wane or skip greater than nine inches but less than twelve inches in length, the stud is designated a “B-8” stud in step 78. Otherwise, the process continues to step 79. In step 79, if the stud is determined to have a continuous area of wane or skip greater than twelve inches but less than fifteen inches in length, the stud is designated a “B-10” stud in step 80. Otherwise, the process continues to step 81. In step 81, if the stud is determined to have a continuous area of wane or skip greater than fifteen inches but less than eighteen inches in length, the stud is designated a “B-12” stud in step 82. Otherwise, the process continues to step 83. In step 83, if the stud is determined to have a continuous area of wane or skip greater than eighteen inches but less than twenty one inches in length, the stud is designated a “B-14” stud in step 84. Otherwise, if in step 83 the stud is found to have a continuous area of wane or skip greater than twenty inches, the stud is rejected in step 84.

In the designations such as "B-#" or "C-#", the number after the "B" or "C" refers to the nominal width of the final laminated stud product. In other words, "B-6" and "C-6" studs may be used in cants which will be re-sawn into laminated stud products having a nominal width of six inches, for example, a 2×6 laminated stud. Furthermore, in the above-described steps, the term "essentially free" is meant to indicate that, based on visual inspection, the stud does not have a significant amount or any of the defects described in that particular step.

Figure 3:
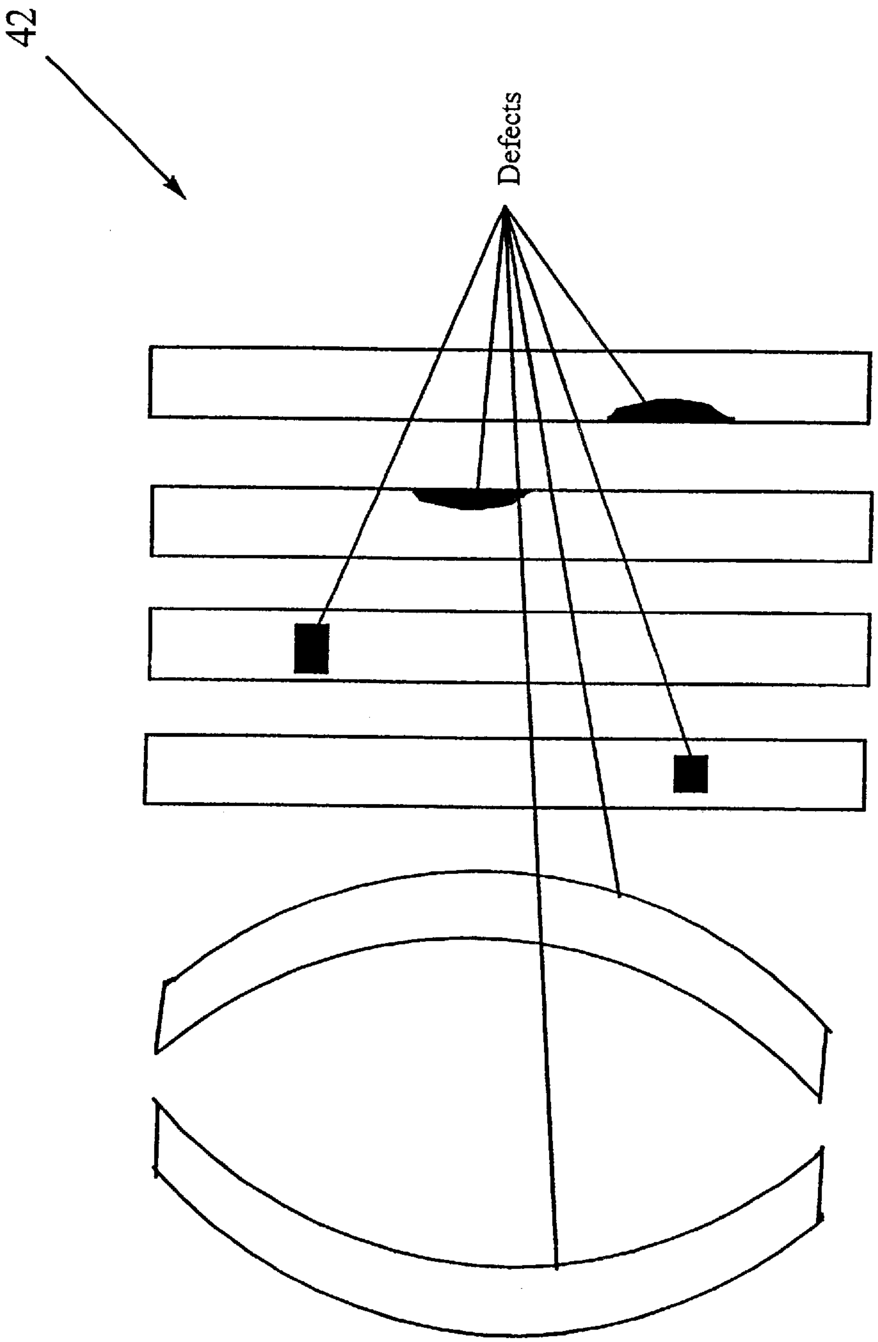
FIG. 3 illustrates an example of a preliminary lay-out of categorized studs created during the "lay-out studs" step of the method of FIG. 1.

After the low-grade studs have been sorted in step 40 of method 30 into the various categories, the next step in method 30 of the invention is the assembly of the categorized studs during step 42. As previously discussed above, a novel and significant feature of the process of the invention is the specific arrangement of the categorized low-grade studs prior to bonding the low-grade studs together to form a cant. The specific categories and subcategories of studs employed in forming the cant, the specific arrangements of the studs in the cant, and the particular number of studs in the cant may vary, depending on the desired size and properties of the final product as will be discussed in more detail below. However, a significant and critical feature of each arrangement is that the studs are specifically arranged such that surface defects on each stud are off-set from surface defects on adjacent studs, which consequently counteracts these defects in the final product to yield a laminated product having a higher grade than that of the original studs. Specifically, regardless of the cant lay-out configuration selected, the categorized studs are preferably arranged in step 42 such that surface defects in adjacent studs are offset, and warp defects on adjacent studs are counteracted. Thus, in general, it is preferred in the lay-out configurations for the cants that: (i) none of the surface defects on a stud in the cant are aligned with surface defects on an adjacent stud in the cant; (ii) the studs are aligned such that defects in the final, laminated product produced from the cant are positioned as close to the middle of the width of the laminated product as possible; and (iii) if adjacent studs in a cant have similar types of warp defects, preferably the studs are positioned or aligned in the cant such that the direction of the warp defect in one stud is in an opposite direction from the warp defect of the adjacent stud, so as to counteract the warp defects on adjacent studs. FIG. 3 illustrates an example of step 42 of method 30 involving the arranging and aligning five studs by off-setting the defects. As shown in FIG. 3, surface defects such as knots, wane, etc. in the studs (indicated by dark squares and dark half-circles) are off-set from the surface defects on the adjacent studs.

FIGS. 4A–4H illustrate exemplary lay-out configurations for cants created in step 42 of method 30, which may be resawn in step 46 into high-grade laminated products of various sizes (for example, 2×4's, 2×6's, 2×8's, 2×10's, 2×12's, 2×14's, and panels) according to the method 30 of this invention. The configurations shown in FIGS. 4A–4H are two-dimensional figures of cants as viewed from the end of the cants. It is to be understood that these figures serve to facilitate explanations of the process and products of the invention, and are not intended to provide accurate depictions, dimensions, or proportions and, more importantly, are not intended to limit the scope of the invention in any way. Thus, for example, the cants illustrated in FIGS. 4A–4H can be of any length. Typically, the studs used for preparing cants are approximately eight feet in length. Also, the studs may be of any width and height, provided that all the studs in each individual cant have approximately the same widths and heights.

Figure 4A:
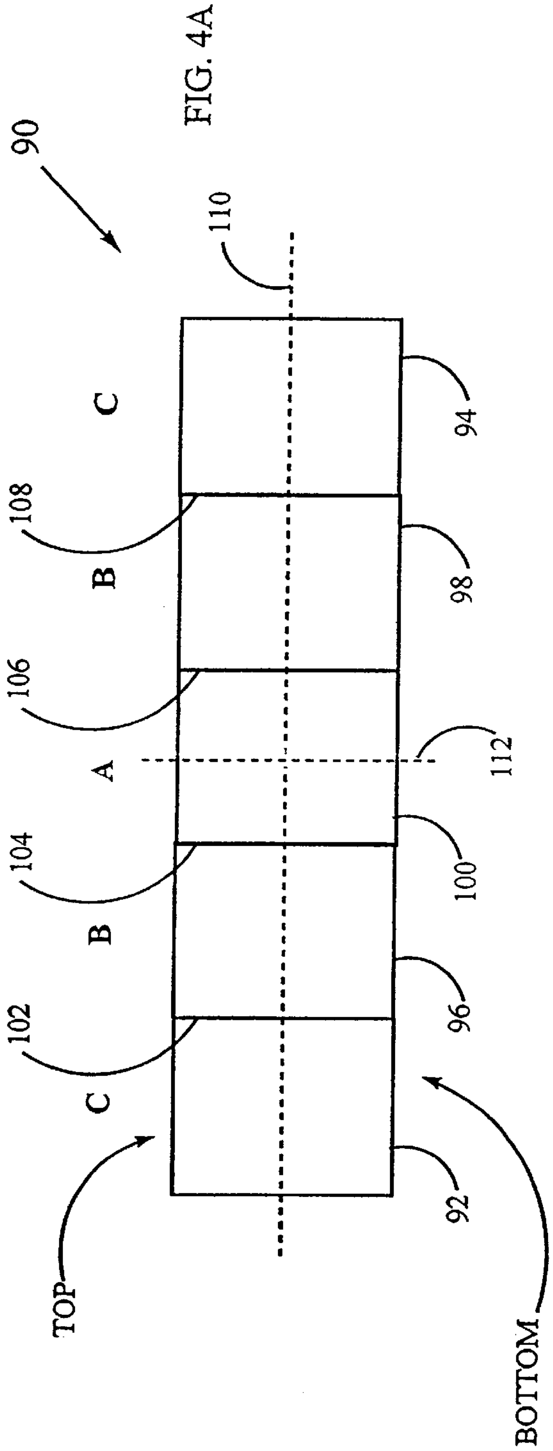
FIGS. 4A–4H illustrate end views representative examples of cant lay-outs produced after the "lay-out studs" step of the method of FIG. 1, and indicate saw lines used to produce the high quality laminated products during the "re-saw cants" step of the method of FIG. 1.
Figure 4B:
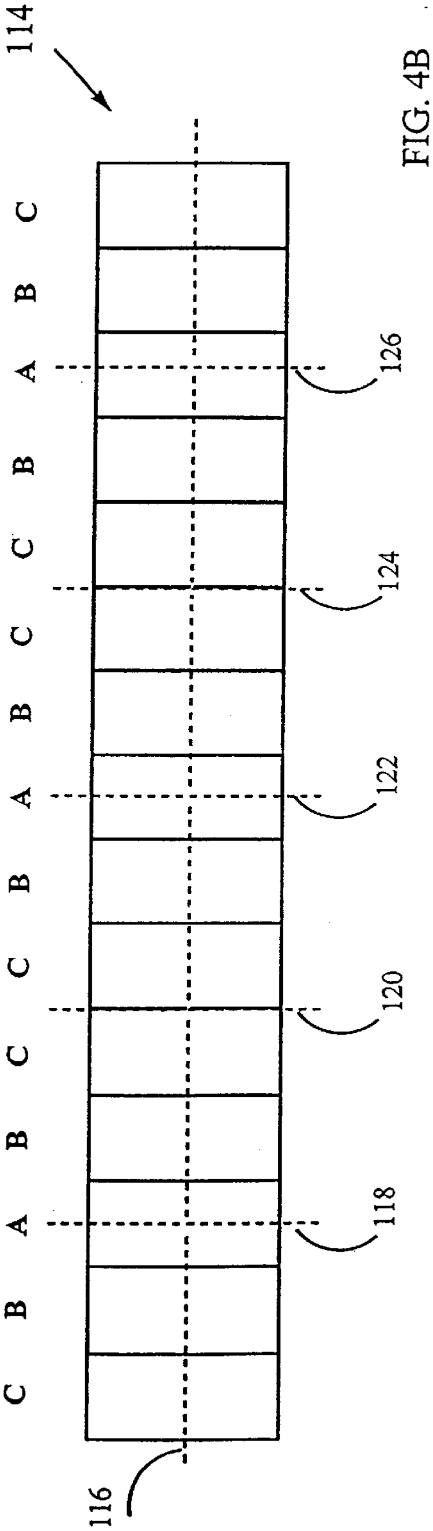

A preferred cant lay-out of the present invention for preparing high-grade 2×4 laminated studs comprises assembling a five-stud cant 90 as shown in FIG. 4A, where the view is from the end of cant 90. In this assembly, cant 90 comprises two "C" studs (92 and 94), two "B" studs (96 and 98), and one "A" stud (100), assembled as a C-B-A-B-C cant. FIG. 4B shows another embodiment of a cant layout for producing 2×4 laminated studs from a plurality of low-grade studs. In this example, the cant 114 illustrated in FIG. 4B is a fifteen-stud cant, which for simplicity of illustration is shown assembled in a C-B-A-B-C-C-B-A-B-C-C-B-A-B-C configuration. In the embodiment shown in FIG. 4B, fifteen economy grade studs are laminated together to form a cant. In assembling cants for preparing 2×4 studs, such as those shown in FIGS. 4A and 4B, it is preferred that the studs are aligned or positioned within the cants such that surface defects in the final, laminated product are not in the same cross-section, that is, defects in adjacent laminates in the final product are approximately at least six inches apart. The term "laminates" as used throughout refers to the portions of studs from a cant which make up a final laminated product, as will be discussed in more detail below.

Figure 4C:
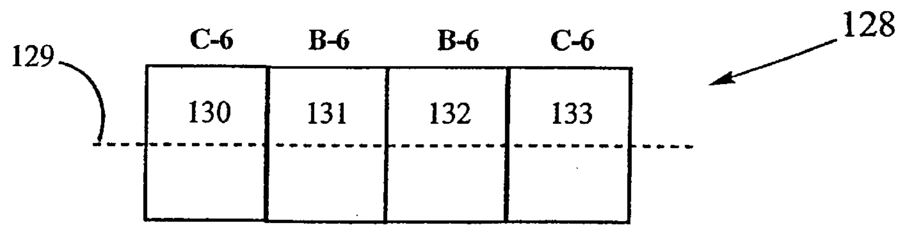

Cant lay-outs for preparing studs having dimensions other than 2×4 studs are shown in FIGS. 4C–4G. FIG. 4C illustrates a preferred cant lay-out 128, comprising four low-grade studs for producing high-grade 2×6 laminated studs. In preparing cants for producing 2×6 laminated studs, it is preferred that the studs are aligned or positioned such that surface defects in laminates in the final, laminated or layered product are spaced closer than six inches from surface defects in adjacent laminates in only two consecutively adjacent laminates.

Figure 4D:
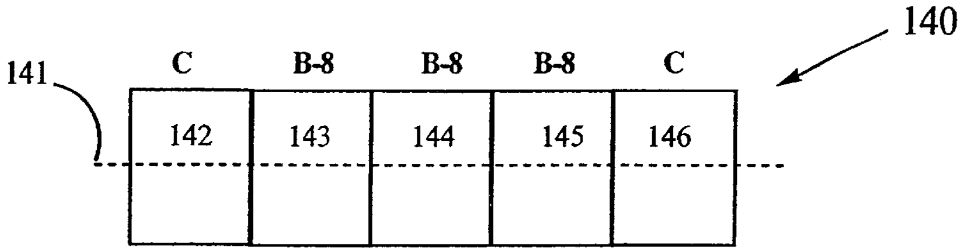

FIG. 4D illustrates a preferred cant lay-out 140 comprising five low-grade studs for preparing high-grade 2×8 laminated studs. In preparing cants for producing 2×8 laminated studs, it is preferred that the studs are aligned or positioned such that surface defects in laminates in the final, laminated product are spaced closer than six inches from surface defects in adjacent laminates in only three or fewer consecutively adjacent laminates.

Figure 4E:
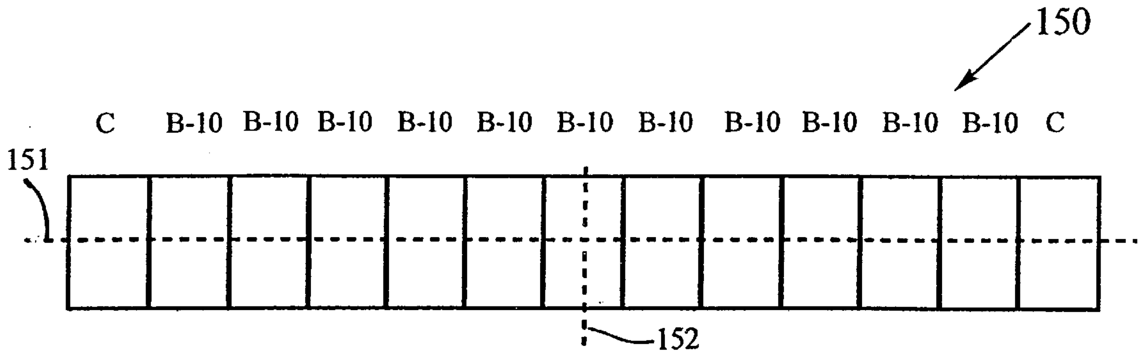

FIG. 4E illustrates a preferred cant lay-out 150 comprising thirteen low-grade studs for preparing high-grade 2×10 laminated studs. In preparing cants for producing 2×10 laminated studs, it is preferred that the studs are aligned or positioned such that surface defects in laminates in the final, laminated product are spaced closer than six inches from surface defects in adjacent laminates in only four or fewer consecutively adjacent laminates.

Figure 4F:
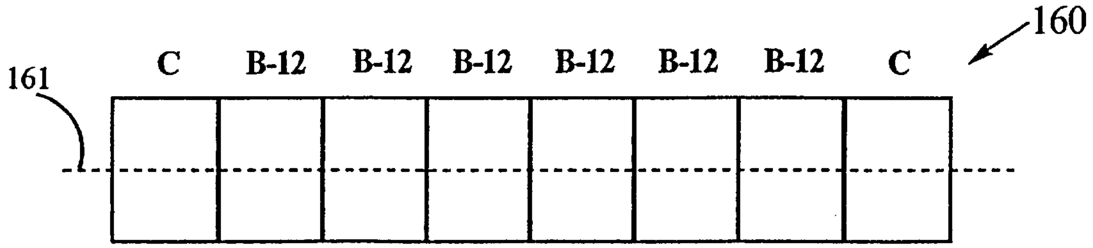

FIG. 4F illustrates a preferred cant lay-out 160 comprising eight low-grade studs for preparing high-grade 2×12 laminated studs. In preparing cants for producing 2×12 laminated studs, it is preferred that the studs are aligned or positioned such that surface defects in laminates in the final, laminated product are spaced closer than six inches from surface defects in adjacent laminates in only five or fewer consecutively adjacent laminates.

Figure 4G:
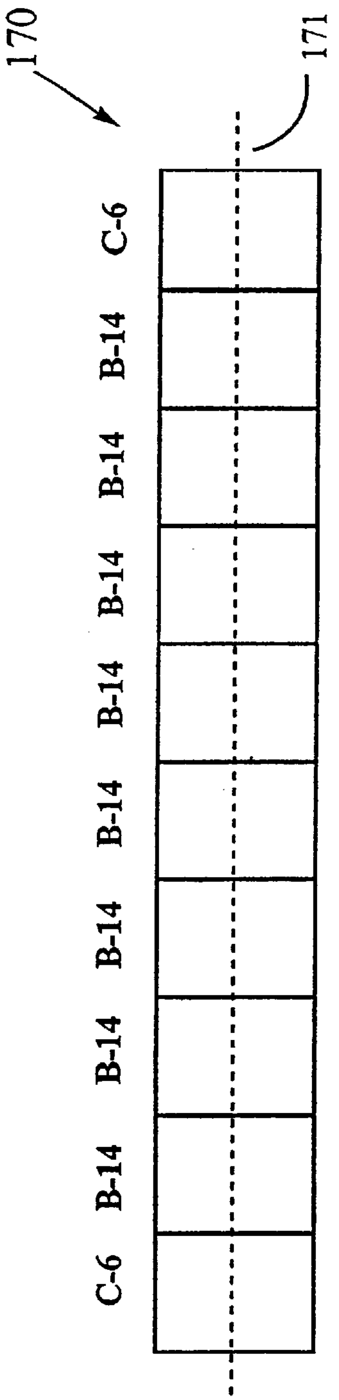

FIG. 4G illustrates a preferred cant lay-out 170 for preparing 2×14 laminated studs. In preparing cants for producing 2×14 laminated studs, it is preferred that the studs are aligned or positioned such that surface defects in laminates in the final, laminated product are spaced closer than six inches from surface defects in adjacent laminates in only six or fewer consecutively adjacent laminates.

Figure 4H:
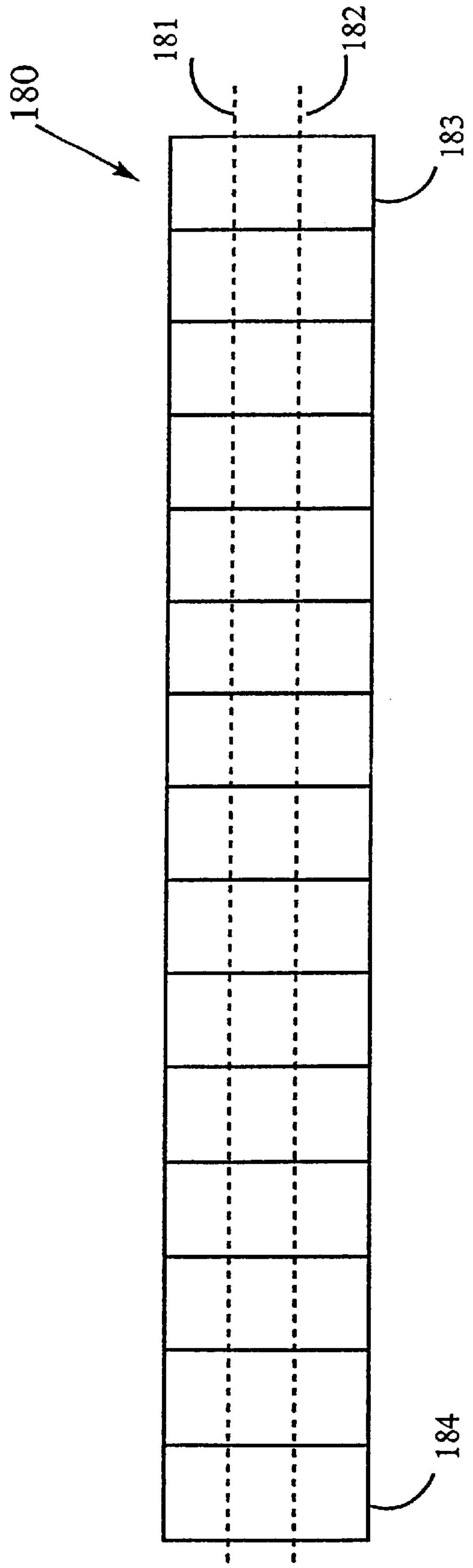

FIG. 4H illustrates a preferred cant lay-out 180 comprising fifteen low-grade studs for preparing high-grade laminated panels. The end studs 183 and 184 of cant 180 are "C-#" category studs, and the remaining studs may be either "A" or "B-#" category studs.

Of course, the cants shown in FIGS. 4A–4H may have various other configurations by making substitutions for the "A", "B" and "C" studs as described herein, provided that lay-out of the cant complies with the above-described lay-out rules. Furthermore, the cant layouts in FIGS. 4A–4H are not meant to be limiting as to the number of studs which are used to form the cants. Any number of economy grade studs may be laminated together to form a cant. However, typically the number of studs in the cant is limited by the maximum depth of the cut of a saw used to bisect the cant.

Furthermore, the studs comprising a cant need not all be obtained from the same species of tree. For example, in cant 90 shown in FIG. 4A, the "A" and "C" studs may be from a Douglas Fir tree, and stud "B" may be from a White Woods tree.

The specific cant configurations shown in FIGS. 4A–4H are designed to provide high-grade laminated studs and panels in the most economical manner, i.e., to provide a method of producing the highest quality possible from the combinations of the lowest quality studs possible. However, it is to be understood that, within any of the cant arrangements described herein, substitutions may be made wherein studs in a "higher" category may be substituted for studs of a "lower" category. Cant 90 shown in FIG. 4A may be used to illustrate this point. Suppose a cant layout 90 is being prepared, and the "B" stud 96 chosen for cant 90 has a significant number of defects such that a "C" stud 92 cannot be found which may be aligned in manner such that surface defects on stud 96 are spaced greater than six inches from surface defects on stud 92. In this instance, an "A" stud, having essentially no surface defects, could be substituted for stud 92 in cant 90, thereby solving the situation of finding a stud which could be aligned with stud 96 according to the layout rules described herein.

Therefore, included in the layout rules described herein, the following substitutions may be performed when laying out studs to prepare a cant. In any cant layout, "A" studs may be substituted for "C" studs. In addition, "A" and "C" studs may be substituted for "B" studs in any of the cant arrangements. Likewise, "C" studs may be substituted for any "C-6" studs. Finally, with respect to the "B" category studs, the following substitutions may be made in any of the cant arrangements: "B-6" studs may be substituted for "B-8", "B-10", "B-12" and "B-14" studs; "B-8" studs may be substituted for "B-10", "B-12" and "B-14" studs; "B-10" studs may be substituted for "B-12" and "B-14" studs; and "B-12" studs may be substituted for "B-14" studs. Therefore, is should be understood by persons of ordinary skill in the art that all of the various possible cant arrangements included in this invention are too numerous to illustrate, and that the representative arrangements shown in FIGS. 4A–4H are not intended to be limiting and are only meant to illustrate the method of the invention.

Referring back to method 30 shown in FIG. 1, once the categorized studs are arranged in a side-by-side manner in step 42 according to the above-described layout rules, the next step, step 44, comprises adhesively bonding the studs face-to-face (a process also known as "face-laminating"). FIG. 4A shows the adhesive lines in cant 90 which comprises the five studs (92, 94, 96, 98, and 100). Cant 90 has four adhesive lines indicated at 102, 103, 106 and 108. In cant assembly 90, stud 92 is face-laminated to stud 96 along adhesive line 102; stud 96 is face-laminated to stud 100 along adhesive line 104; stud 100 is face-laminated to stud 98 along adhesive line 106; and stud 98 is face-laminated to stud 94 along adhesive line 108.

In general, the selection of the adhesive for bonding the studs will be based on the physical properties of the adhesive and its components, and the equipment required to mix and maintain the adhesive. Any kind of adhesive suitable for bonding wood may be used. If the high-grade laminated stud products are to be used in exterior applications, it is preferred that the adhesive meets ASTM D 2559, ASTM D 4609, and ANSI/AITC A 190 specifications. These specifications will ensure that the laminated stud products comprising such an adhesive will be suitable for use in exterior applications, and will further ensure that the individual laminae of the laminated stud products will not delaminate over time due to adhesive breakdown. One example of a preferred adhesive is a phenol resorcinol formaldehyde (PRF)-based adhesive. When properly cured, PRF adhesives produce a waterproof bond that meets wet use (exterior) specifications and ASTM and ANSI/AITC codes applicable to laminated studs. The amount of adhesive used and the application method will vary according to recommendations provided by the adhesive manufacturer, and such amounts and methods are familiar to those of skill in the art.

In step 44 of method 30, after all the studs in a cant have been face-laminated, the cant is preferably placed in a clamping unit, which applies at least the minimum amount of pressure required by the adhesive specifications to ensure complete lamination. The methods and amount of clamping will depend on the type of adhesive used, and can readily be determined by one of skill in the art. In one preferred method, the clamps are first tightened to an initial tightness, the cants are then allowed to rest for a period of time, (e.g., one to two minutes), and finally the clamps are then tightened again to produce an even tighter cant. This clamping method provides a final product which will have far fewer delaminations. In addition to holding the studs together during the drying cycle for the adhesive, the clamps also help to eliminate warp defects within the horizontal plane of the cant.

To eliminate warpage present in the flat-wise plane of the cant (that is, above or below the plane of the cant), a hydraulic press or other methods of pressing the cant may be employed on either the top, the bottom, or both the top and bottom of the cant, as indicated in FIG. 4A. The amount of pressure required to eliminate warpage in the flat-wise plane of the cant will depend, of course, on the severity of the warpage. The combination of clamping and pressing the face-laminated cant will result in a cant which is essentially free of warp defects and is sufficiently strengthened relative to the original low-grade studs that make up the cant, and is thus suitable for re-sawing to produce the final product.

Once the adhesive means, clamping means and optionally pressing means have been applied to the cant in step 44, the adhesive may be dried by any number of conventional means known in the art, such as by radio frequency, cold set, or by other means as specified by the adhesive manufacturer.

After the step 44 is completed, or when a cant is ready for re-sawing into the desired products in step 46 of method 30, the cant can be transported to a process line commonly found in sawmills for sawing lumber. FIG. 4A illustrates the saw lines for producing four high-grade laminated 2×4 studs from cant 90. In resawing cant 90 to products the laminated stud products, cant 90 is first resawn along a line perpendicular to the adhesive lines as indicated by dashed line 110, thereby bisecting the cant 90 into two laminated flitches. Each of the two flitches produced from the cant 90 comprises one half of each of the original studs 92, 94, 96, 98, and 100. The two flitches are then ripped along dashed line 112 in a plane parallel to the adhesive lines, each of the two flitches providing two high-grade laminated studs. Thus, one flitch will produce two laminated studs, each stud having three laminates or portions comprising approximately one half of original stud 92, one half of original stud 96, and one quarter of original stud 100. The other flitch will produce two laminated studs, each having three laminates comprising approximately one half of original stud 94, one half of original stud 98, and one quarter of original stud 100. The example shown in FIG. 4A thus demonstrates how five low-grade studs are converted into four new high-grade laminated 2×4 studs by method 30 of this invention. Of course, as will be understood by persons of skill in the art, the dimensions of the final laminated or layered products obtained after step 46 are only approximate dimensions, and the laminated or layered products may be further planed using methods know in the art to provide laminated products having the desired dimensions.

FIG. 4B shows another embodiment of the invention for producing laminated or layered 2×4 studs from a plurality of low-grade studs. In this example, cant 114 illustrated in FIG. 4B is a fifteen-stud cant. Cant 114 is first resawn along the saw line indicated at dashed line 116 in a plane perpendicular to the adhesive lines to bisect the cant 114 into two flitches, each of the two flitches containing a portion of each of the original fifteen studs used to create the cant 114. The two flitches produced from the cant 114 are then ripped along dashed lines 118, 120, 122, 124 and 126 to produce twelve high-grade laminated studs, each of the twelve studs comprising three laminates and each of the twelve studs having including a portion of an original "C" stud, a portion of an original "B" stud, and a portion of an original "A" stud.

As described previously, it is preferred that the 2×4 laminated stud products produced by method 30 of the invention do not have surface defects that are in the same cross-section, that is, it is preferred that surface defects in one laminate of the 2×4 stud product are spaced further than six inches from surface defects in adjacent laminates.

FIGS. 4C–4H illustrate examples of sawing cants for preparing laminated products other than 2×4 studs, such as 2×6, 2×8, 2×10, 2×12 and 2×14 laminated stud pro stud products are capable of containing more defects which are space closer together than is preferred for the smaller-dimensioned 2×4 laminated stud products, while still providing studs which meet stud grade quality ratings.

FIG. 4C shows a cant 128 comprising four low-grade studs which, after being re-sawn along line 129, will produce two high-grade 2×6 laminated stud products, each product having four laminates indicated as laminates 130, 131, 132 and 133 in FIG. 4C. In such a 2×6 laminated stud, surface defects a laminate may be spaced closer than six inches to surface defects in an adjacent stud, however, it is preferred that this occurs in only two adjacent laminates. Thus, for example, if surface defects in laminate 130 are spaced closer than six inches from surface defects in laminate 131, then it is preferred that surface defects in laminate 131 are spaced more than six inches from surface defects in laminate 132, and in addition that surface defects in laminate 132 are spaced more than six inches from surface defects in laminate 133.

FIG. 4D shows a cant 140 comprising five low-grade studs which, after being re-sawn along line 141, will produce two high-grade 2×8 laminated stud products, each product having five laminates, indicated in one of the 2×8 products as laminates 142, 143, 144, 145 and 146. In such 2×8 laminated stud products, it is preferred that the maximum number of consecutive laminates having surface defects on a laminate spaced closer than six inches from surface defects on adjacent laminates is three laminates. For example, in FIG. 4D, if laminate 142 has surface defects spaced closer than six inches from surface defects in laminate 143, and laminate 143 has surface defects spaced closer than six inches from surface defects in laminate 144, then it is preferred that surface defects in laminate 144 are spaced more than six inches from surface defects in laminate 145, and in addition that surface defects in laminate 145 are spaced more than six inches from surface defects in laminate 146. Thus, in such an example, the 2×8 laminated stud product would have three consecutive laminates (142, 143 and 144) having surface defects spaced closer than six inches in adjacent laminates.

FIG. 4E shows a cant 150 comprising thirteen low-grade studs which, after being re-sawn along line 151 and then ripped along line 152, will produce four high-grade 2×10 laminated stud products, each product having seven laminates. In such 2×10 laminated stud products, it is preferred that the maximum number of consecutive laminates having surface defects on a laminate spaced closer than six inches from surface defects on adjacent laminates is four laminates.

FIG. 4F shows a cant 160 comprising eight low-grade studs which, after being re-sawn along line 161, will produce two high grade 2×12 laminated stud products, each product having eight laminates. In such 2×12 laminated stud products, it is preferred that the maximum number of consecutive laminates having surface defects on a laminate spaced closer than six inches from surface defects on adjacent laminates is five laminates.

FIG. 4G shows a cant 170 comprising ten low-grade studs which, after being re-sawn along line 171, will produce two high-grade 2×14 laminated stud products, each product having ten laminations. In such 2×14 laminated stud products, it is preferred that the maximum number of consecutive laminates having surface defects on a laminate spaced closer than six inches from surface defects on adjacent laminates is six laminates.

FIG. 4H illustrates a cant 180 comprising fifteen low-grade studs which, after being re-sawn along lines 181 and 182, produces three high grade laminated panels, each panel having fifteen laminations.

In all laminated products produced by method 30, such as those described in FIGS. 4A–4H, it is preferred that the final laminated product does not have defects over more than seventy percent of any cross-section of the final, laminated product.

The resulting high-grade laminated products obtained by step 46 of method 30 may be processed through a planer for final planing to yield the final laminated product. In an alternative embodiment, if the flitches obtained after the first resawing in step 46 are sufficiently narrow, the flitches may be processed though a planer with splitter heads, which simultaneously rips and planes the flitches into the final high-grade laminated products. The products may then be tested to determine if the studs are of stud grade or a higher grade.

Figure 5A:
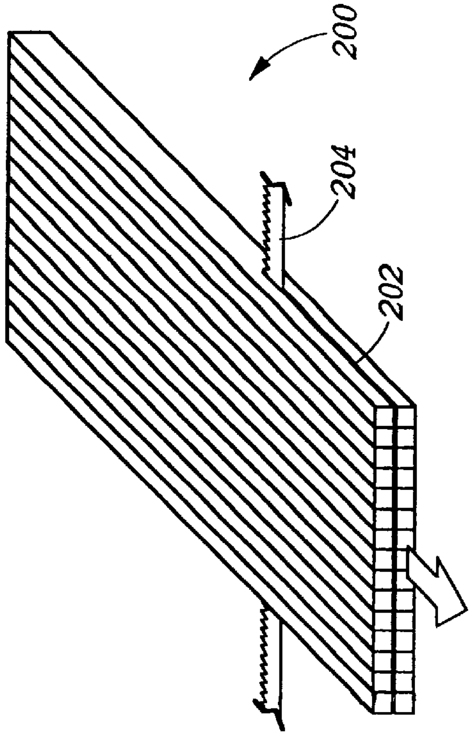
FIG. 5A illustrates an example of the "re-saw cants" step of FIG. 1 involving resawing a cant into two flitches, and 5B illustrates an example of sawing the two flitches from FIG. 5A into laminated studs.
Figure 5B:
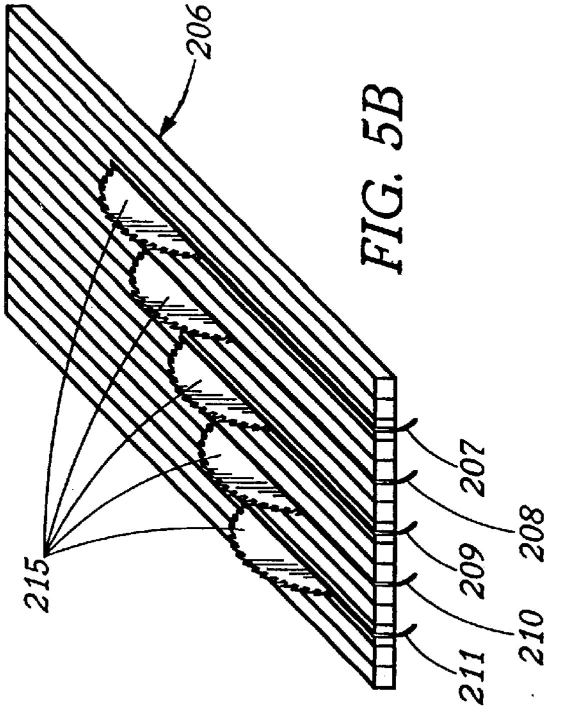

FIGS. 5A shows a three-dimensional view of a cant 200, comprised of a plurality of laminated studs, being resawn along line 202 by saw 204 in the resawing portion of step 46 of method 30, which will produce two flitches. FIG. 5B illustrates one of the flitches 206 produced from the re-saw step shown in FIG. 5A. The flitch 206 may be ripped along lines 207, 208, 209, 210, and 211 by saws 215 to produce six high-grade laminated studs.

Figure 6:
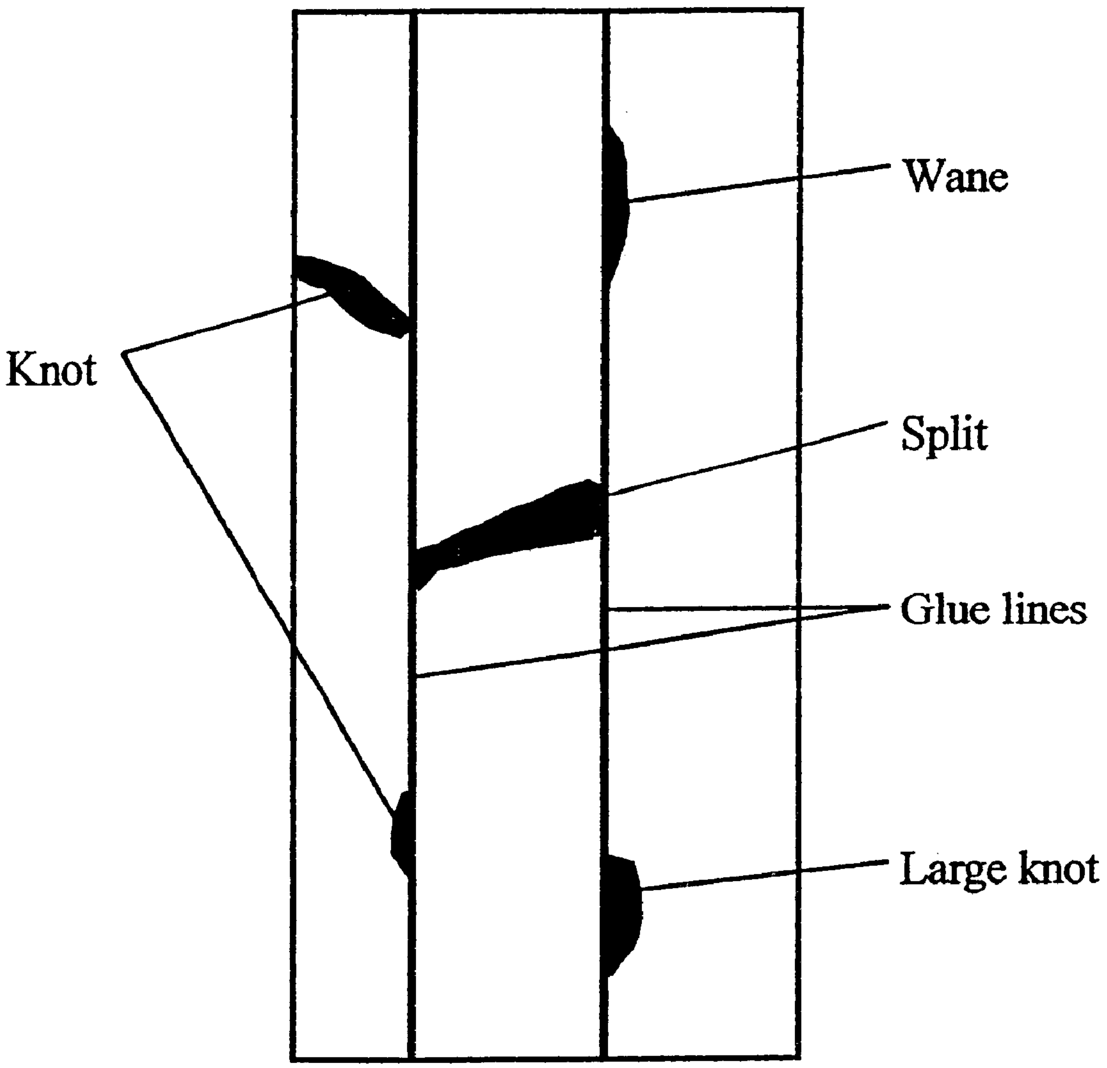
FIG. 6 is an example of a laminated, high-grade stud made by the method of FIG. 1, indicating off-set defects in the high-grade studs.

FIG. 6 is an example of a high-grade laminated stud produced by method 30, comprising three laminates, showing the off-set defects in the high-grade laminated stud.

As discussed above, method 30 may be performed using lumber from various species of trees. That is, the cants are not necessarily assembled from studs obtained from the same species of trees. Thus, cants may be assembled using studs obtained from several different species. For example, a cant may be assembled from several studs obtained from Douglas Fir, which is a stronger wood, and from several stud obtained from White Woods, which is a weaker wood than Douglas Fir, as discussed below.

The method of the present invention demonstrates the feasibility of using low-grade wood products to produce construction quality lumber. The process laminates low-grade lumber in a manner which offsets defects in the lumber, and re-saws the laminate to provide strengthened, high-grade laminated products such as 2×4 studs. This method can be used to manufacture lumber that is higher grade than stud grade, and can be used to manufacture studs larger than 2×4's.

Any size dimensional lumber can be used in the method of the present invention. There are no restrictions on the thickness, width, length or grade. Low-grade lumber such as economy, grade No. 4 or grade No. 5, and utility grades are preferable since the use of these types of lumber results in a higher increase in the economic value of the final product, verses using higher grade woods in the process. Medium grade lumber can also be used in this process, particularly when a high value specialty product is desired. The process of this invention dramatically reduces demand of forest natural resources for producing high-grade construction quality lumber. As a result of utilizing the process of this invention, approximately twenty percent more of each sawlog will be used to produce construction quality lumber from low-grade lumber that is currently used only for low value pulp chips and packing material. In addition, about ten percent more of the forest harvest can be used to produce high-grade lumber with the process of this invention, rather than being left in the forest as waste material as in current practice. The process of this invention offers sawmills the opportunity to significantly lower operating costs by lowering forest raw material requirements, and increasing high-grade lumber yield. Stud production using the process of this invention can be implemented at sawmill operations with minimal impact on sawmill operations, and low capital investment requirements.

High-grade laminated stud products made by the process of this invention have many material construction applications including use as wall studs, and potentially higher grade uses, such as laminated beams, and larger size lumber.

STRESS TESTING OF LAMINATED PRODUCTS

This section describes the various stress tests performed on laminated stud products produced by the method 30 of this invention.

Visual Grading and Design Values

The National *Design Specification* (NDS) and its supplement, *Design Values for Wood Construction* (DVWC), specify the rules for design and allowable stress values for various species of wood. The allowable stresses (also known as "design values") depend on the species of the material and the quality of the piece of lumber. Lumber quality can be evaluated by visual inspection of each piece. The visual grading process identifies the number, size, and significance of strength-reducing defects such as knots, splits, wane, and warp. Following visual grading, each piece of lumber is assigned to a stress grade category. Key design values for stud grade dimension lumber of the White Wood species groups are:

| | |
|---|---|
| Bending: | $F_b$ = 500 psi |
| Compression parallel to the grain: | $F_c$ = 550 psi |
| Modulus of elasticity: | E = 900,000 psi |

Structural testing was conducted to establish the strength of laminated studs produced by the method 30 of this invention. To ensure the economic viability of the process of the invention, studs produced by the method 30 preferably meet the requirements for strength and stiffness required by the applicable code, in this case the NDS. The same visual grading standards used on conventional dimension lumber were applied to laminated stud products produced by method 30. Hence, any laminated stud (e.g., a 2×4 stud made by the process of the invention) that meets the appropriate visual grade must then also yield satisfactory design values for that grade. Several different types of structural tests were performed to ensure that the 2×4 studs produced by the method 30 will achieve the required statistical levels of strength and stiffness to be acceptable for sale in a particular stress grade.

Material Handling and Moisture Control

Moisture content of the specimens was controlled to near fifteen percent in a specially constructed storage room, where the specimens were kept until structural testing could be conducted.

Types of Tests and Specimen Data

The following tests were performed on the laminated products produced by the method 30 of this invention:

Modulus of Elasticity,

Bending Strength,

Compression Strength.

All test pieces were determined to be at least a stud grade (see Scheme 1). Pieces that had visual appearances to qualify for higher than stud grade were categorized according to L1, L2, and L3. L1, L2, and L3 are grade designations for core stock to be used in structural laminated beams. These pieces were isolated to determine whether their strength characteristics would equate to the visual characteristics of these higher grades.

Four production test runs were performed to produce laminated studs from White Wood species, including any true firs, spruces, hemlocks or pines. Run 1 was an initial exercise of the method 30 and of the testing methods. Runs 2 and 3 utilized adjusted rules based on observations from Run 1. Run 4 tested the blending of two species, Douglas Fir and White Woods. The "A" and "C" boards of each cant were Douglas Fir (the stronger of the species), and "B" boards were White Woods. Thus, the exterior laminae of each stud produced during Run 4 was Douglas Fir.

Modulus of Elasticity (Flat-wise Bending)

Modulus of elasticity tests were performed on full-length studs in flat-wise bending. Roller supports were provided and all ASTM D 4761 procedures were followed. The pre-load and test loads were applied manually. Deflection was measured at mid-span of each stud with a dial gauge. Tests were conducted on each flat-wise side of the stud and the average of the two tests was used to calculate the modulus of elasticity (MOE) values. The short-span MOE values were calculated and converted to long span values according to ASTM D 4761. Appropriate modifications for effects of moisture content were also made in each value of MOE. A summary of the results of the modulus of elasticity testing are provided in Table 1. The MOE values (E) for all runs were well above the required 900,000 psi NDS specification value.

Bending Tests (Edgewise Bending)

The test span in the MTS testing system was six feet. The data acquisition was managed by an automated, computer-based system (LabView). Loads and deflections were measured with transducers and the output was converted for load-deflection plotting and stored by the program. All procedures of ASTM D 4761 were followed. The results of the bending tests are provided in Table 2. Modifications for the effects of moisture content were made according to ASTM procedures. The bending stress values ($F_b$) for all runs were well above the required 500 psi NDS specification value.

Several types of failures were observed for the laminated studs in bending. The failures are dependent on the presence of defects, especially knots in the tension lamination near the center of the stud. Shear failures and compression (crushing in the compression lamination) generally occurs at higher loads than those categorized as simple tension and splintering tension.

Compression Parallel to the Grain

The compression specimens were cut to a length of fourteen inches. Procedures given in ASTM D 4761 were followed. The specimens for compression testing were cut from the eight-foot length of the stud. Compression specimens were selected according to ASTM D 4761 ANNEX, A1.

The minimum length of a 2×4 test specimen was fourteen inches. The minimum length was used in preparing specimens. Two specimens were ultimately cut from each board. The boards were cut such that the most critical strength-reducing defect was centered in the fourteen-inch specimen. The same was done for the second most critical strength-reducing defect. In the event that these two characteristics were less than fourteen inches apart and close enough to fit together in one piece, they were both included. In this situation, a third defect was then marked and included in a second specimen.

As in testing for bending, the data-acquisition system was controlled by the computer program (LabView). The output of the load and deflection transducers was automatically recorded and plotted for analysis. Speed of testing was controlled using the computer program and each specimen was loaded to failure. Results of the compression parallel to grain testing for Run 2 are provided in Table 3. Modifications for moisture content was per ASTM were made prior to reporting the data. The values for compression parallel to grain ($F_c$) for all runs were well above the required 500 psi NDS specification value.

In addition, the compressive strength at seventy-five percent confidence with a 2.1 factor of safety for Runs 1–4 were determined. The average compressive strength for Run 1, Run 2, Run 3, and Run 4 was 1400 psi, 745 psi, 886 psi, and 1189 psi, respectively.

The values obtained in the compression tests demonstrate conclusively that compression parallel to the grain is not a structural issue for the laminated studs of the invention, even for the fabrication process used in the initial trial sample.

While typical failures in the compression specimens occurred, these failures are typical of compression failures of short solid-wood specimens in compression. While some effects of lamination are undoubtedly present, the failure types are not markedly different from those expected in solid wood 2×4 studs. Some splitting was noted at knot locations, however this effect also occurs in solid wood compression members and does not represent a serious structural issue for the process of the invention.

The results shown in Tables 1–3 demonstrate that the method of the invention is effective in producing improved quality 2×4 studs from low-grade lumber.

The foregoing description is considered as illustrative only of the principles of the invention. Furthermore, since numerous modifications and changes will readily occur to those skilled in the art, it is not desired to limit the invention to the exact construction and process shown and described above. Accordingly, resort may be made to all suitable modifications and equivalents that fall within the scope of the invention as defined by the claims which follow. The words "comprise," "comprises," "comprising," "include," "includes," and "including" when used in this specification and in the following claims are intended to specify the presence of stated features, integers, components, or steps, but they do not preclude the presence of addition of one or more other features, integers, components, steps or groups thereof.

The description and examples set forth herein are intended to illustrate representative embodiments of the invention. The claims which follow are not intended to be limited to the specific disclosed embodiments. The invention is susceptible to modifications, variations and changes including, without limitation, those known to one of ordinary skill in the art without departing from the proper scope or fair meaning of the following claims. For example, many, if not all, of the steps described above can be combined or performed in one or more alternative orders or sequences without departing from the scope the present invention and the claims should not be construed as being limited to any particular order or sequence.

TABLE 1

Modulus of Elasticity test results

| Run & Grade | # of Tests | Average MOE Values (E) (psi) |
|---|---|---|
| Run 2 | | |
| Stud | 59 | 1,292,000 |
| L1 | 0 | N.A. |
| L2 | 6 | 1,300,000 |
| L3 | 45 | 1,316,000 |
| Run 3 | | |
| Stud | 45 | 1,322,000 |
| L1 | 5 | 1,440,000 |
| L2 | 7 | 1,386,000 |
| L3 | 44 | 1,336,000 |
| Run 4 | | |
| Stud | 89 | 1,515,000 |

TABLE 2

| Run & Grade | # of Tests | Average Bending Stress ($F_b$) (psi) | Maximum Standard Deviation (psi) |
|---|---|---|---|
| Bending test results | | | |
| Run 2 | | | |
| Stud | 59 | 3770 | 1530 |
| L1 | 0 | N.A. | |
| L2 | 6 | 4320 | 900 |
| L3 | 45 | 4230 | 1410 |
| Run 3 | | | |
| Stud | 45 | 4100 | 1350 |
| L1 | 5 | 5980 | 1800 |
| L2 | 7 | 4730 | 840 |
| L3 | 44 | 4280 | 1460 |
| Run 4 | | | |
| Stud | 89 | 5030 | 1540 |

TABLE 3

| Run & Grade | # of Tests | Average Stress ($F_c$) (psi) | Maximum Compression Standard Deviation (psi) |
|---|---|---|---|
| Compression test results | | | |
| Run 2 | | | |
| Stud | 98 | 3000 | 392 |
| L1 | 0 | N.A. | N.A. |
| L2 | 2 | 2900 | N.A. |
| L3 | 2 | 3150 | N.A. |

The embodiments of the invention in which an exclusive property or privilege is claimed are defined as follows:

1. A method for producing a high-grade laminated wood product from low-grade studs having surface defects and warp defects, said method comprising:

categorizing one or more low-grade studs based on surface defects on said low-grade studs;

aligning a plurality of said categorized studs, wherein said studs are aligned such that said surface defects on each said stud are off-set from said surface defects on an adjacent stud, and said warp defects on each said stud are aligned to counteract said warp defects on adjacent studs;

face-laminating said aligned plurality of said categorized low-grade studs to form a cant; and re-sawing said cant to produce at least one laminated wood product;

wherein said categorized stud is a type A stud, type B stud, or type C stud.

2. The method of claim 1, wherein said type A stud comprises a low-grade stud which is essentially free of wane, skip or void four inches from the end of said stud, essentially free of one or more voids, wherein said one or more voids each has a width greater than one-half the width of the stud and a length greater than one and one-half inches, and wherein said stud is essentially free of wane or skip in the width of the stud and essentially free of loose or unsound knots, splits, voids, or bark pockets.

3. The method of claim 1, wherein said type B stud is a low-grade stud which is essentially free of wane, skip or void four inches from the end of said stud, essentially free of one or more voids, wherein said one or more voids each has a width greater than one-half the width of the stud and a length of greater than one and one-half inches, and is essentially free of wane or skip in the width of the stud.

4. The method of claim 1, wherein said type B stud is a low-grade stud which is essentially free of wane, skip or void four inches from the end of said stud, and has one or more voids, wherein said one or more voids each has a width greater than one-half the width of the stud and a length of between one and one-half and two inches.

5. The method of claim 1, wherein said type B stud is a low-grade stud which is essentially free of wane, skip or void four inches from the end of said stud, and has one or more voids, wherein said one or more voids each has a width greater than one-half the width of the stud and a length of between two and three and one-half inches.

6. The method of claim 1, wherein said type B stud is a low-grade stud which is essentially free of wane, skip or void four inches from the end of said stud, and has one or more voids, wherein said one or more voids each has a width greater than one-half the width of the stud and a length of between three and one-half and five inches.

7. The method of claim 1, wherein said type B stud is a low-grade stud which is essentially free of wane, skip or void four inches from the end of said stud, and has one or more voids, wherein said one or more voids each has a width greater than one-half the width of the stud and a length of between five and six and one-half inches.

8. The method of claim 1, wherein said type B stud is a low-grade stud which is essentially free of wane, skip or void four inches from the end of said stud, and has one or more voids, wherein said one or more voids each has a width greater than one-half the width of the stud and a length of between six and one-half and eight and one-half inches.

9. The method of claim 1, wherein said type B stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than three quarters of the width of the stud for a distance between six and nine inches.

10. The method of claim 1, wherein said type B stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than three quarters of the width of the stud for a distance between nine and twelve inches.

11. The method of claim 1, wherein said type B stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than three quarters of the width of the stud for a distance between twelve and fifteen inches.

12. The method of claim 1, wherein said type B stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than three quarters of the width of the stud for a distance between fifteen and eighteen inches.

13. The method of claim 1, wherein said type B stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than three quarters of the width of the stud for a distance between eighteen and twenty one inches.

14. The method of claim 1, wherein said type C stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and is essentially free of a continuous area of wane or skip having a width greater one-fourth of the width of the stud for a distance greater than one-third the length of the stud.

15. The method of claim 1, wherein said type C stud is a low-grade stud which is essentially free of wane, skip, or voids four inches from the ends of the stud, is essentially free of one or more voids, wherein said one or more voids each has a width greater than one-half the width of the stud and a length greater than one and one-half inches, and has a continuous area of wane or skip having a width greater than one-half the width of the stud for a distance of greater that one-third the length of the stud.

16. The method of claim 1 wherein said categorized low-grade studs are aligned such that said surface defects on each low-grade stud are at least six inches from surface defects on adjacent studs.

17. The method of claim 1, wherein said low-grade studs are aligned such that defects present in the high-grade laminated product are centered in the middle of the width of the product.

18. The method of claim 1, wherein said surface defects are less than seventy percent of any cross-section of the final, laminated product.

19. The method of claim 1, wherein said product is a two inch by six inch stud having four laminates, wherein surface defects are not spaced closer than six inches apart in more than two consecutive laminates.

20. The method of claim 1, wherein said product is a two inch by eight inch stud having four laminates, wherein surface defects are not spaced closer than six inches apart in more than three consecutive laminates.

21. The method of claim 1, wherein said product is a two inch by ten inch stud having four laminates, wherein surface defects are not spaced closer than six inches apart in more than four consecutive laminates.

22. The method of claim 1, wherein said product is a two inch by twelve inch stud having four laminates, wherein surface defects are not spaced closer than six inches apart in more than five consecutive laminates.

23. The method of claim 1, wherein said product is a two inch by fourteen inch stud having four laminates, wherein surface defects are not spaced closer than six inches apart in more than six consecutive laminates.

24. The method of claim 1, wherein said cant comprises five low-grade studs.

25. The method of claim 1, wherein said cant comprises fifteen low-grade studs.

26. The method of claim 1, wherein said re-sawing comprises sawing said cant in a plane perpendicular to the laminated faces to form two flitches.

27. The method of claim 26, wherein said re-sawing comprising sawing said flitches along one or more saw lines in a plane parallel to said laminated faces.

28. The method of claim 26, wherein each of said two flitches includes a portion of each of said aligned plurality of categorized low-grade studs.

29. The method of claim 26, wherein at least one of said two flitches includes a portion of each of said aligned plurality of categorized low-grade studs.

30. The method of claim 1, wherein said studs are categorized based on the quantity and type of said surface defects present on said low-grade studs.

31. The method of claim 1, wherein said surface defect is a knot, wane, skip, split, void, or bark pocket.

32. The method of claim 1, wherein said warp defect is twist, bow, sweep, or crook.

33. The method of claim 1, wherein said face-laminating further includes applying pressure in a plane perpendicular to the plane of the laminated faces to remove said warp defects.

* * * * *